United States Patent [19]

Falcimaigne

[11] Patent Number: 4,984,527
[45] Date of Patent: Jan. 15, 1991

[54] DEVICE FOR THE REMOTE ASSEMBLY OF TWO MEMBERS

[75] Inventor: Jean Falcimaigne, Bois Colombes, France

[73] Assignee: Institut Francais du Petrole, Rueil Malmaison, France

[21] Appl. No.: 236,447

[22] Filed: Aug. 25, 1988

Related U.S. Application Data

[63] Continuation of Ser. No. 863,720, May 16, 1986, abandoned.

[30] Foreign Application Priority Data

May 17, 1985 [FR] France .................... 85 07583

[51] Int. Cl.$^5$ ............................................. B63B 35/44
[52] U.S. Cl. ........................................ 114/264; 114/51; 405/195
[58] Field of Search ............... 114/264, 265, 258, 259, 114/293, 294, 221 R, 51; 166/341, 338, 342, 339, 344, 350, 343; 405/169–172, 223, 224, 195

[56] References Cited

U.S. PATENT DOCUMENTS

| | | | |
|---|---|---|---|
| 928,536 | 7/1909 | Dino | 114/51 |
| 3,722,585 | 3/1973 | Nelson | 285/29 |
| 4,216,834 | 8/1980 | Wardlaw | 175/7 |
| 4,491,439 | 1/1985 | Watkins | 405/224 |
| 4,540,314 | 9/1985 | Falkner, Jr. | 405/227 |

Primary Examiner—Joseph F. Peters, Jr.
Assistant Examiner—Edwin L. Swinehart
Attorney, Agent, or Firm—Antonelli, Terry, Stout & Kraus

[57] ABSTRACT

A device for the remote assembly of two members using at least one oblong assembly element, comprising an anchoring arrangement for anchoring its assembly element on one of said members, or first member, a remote control arrangement for tensioning said assembly element and remote controlled locking arrangement for locking the assembly element on the other member, or a second member.

11 Claims, 3 Drawing Sheets

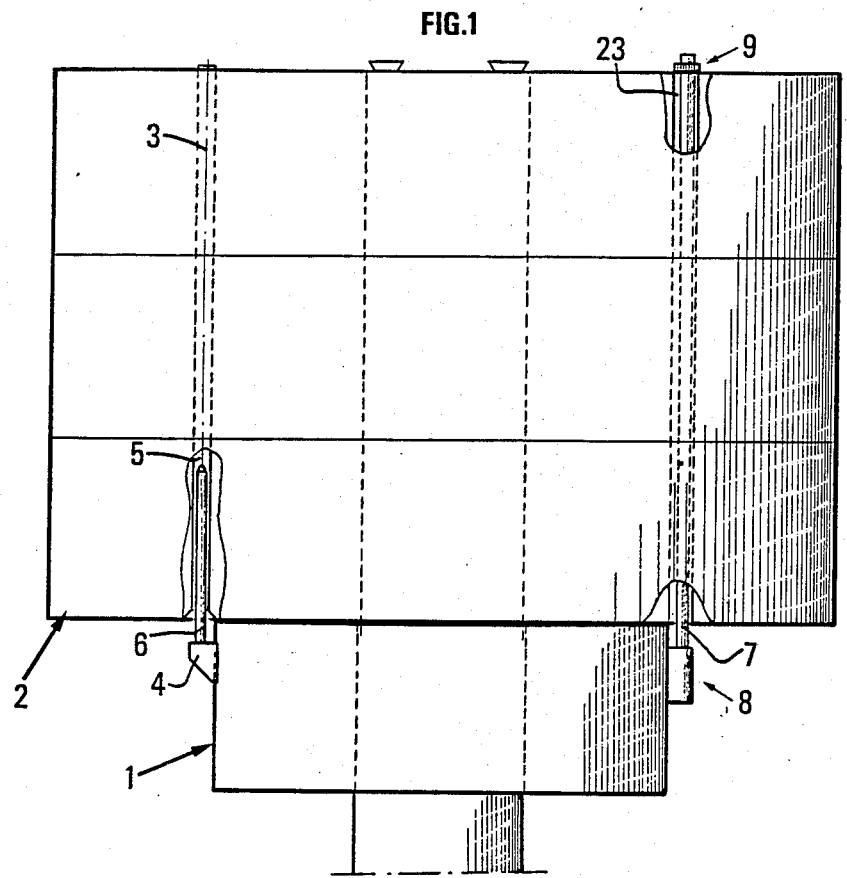
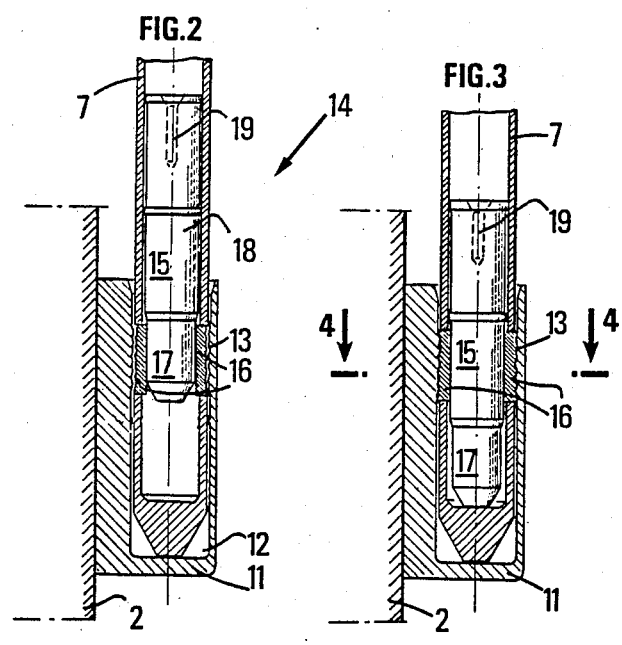
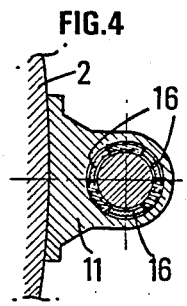

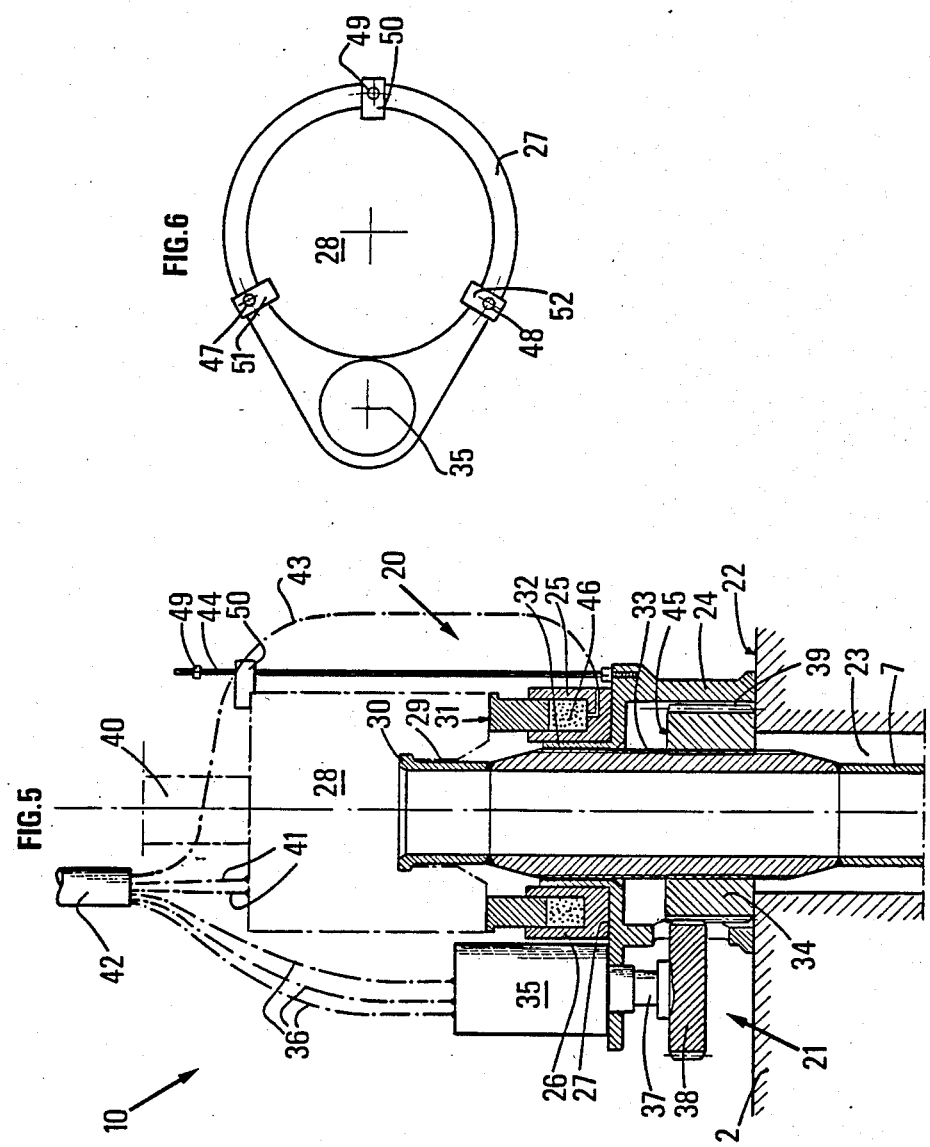

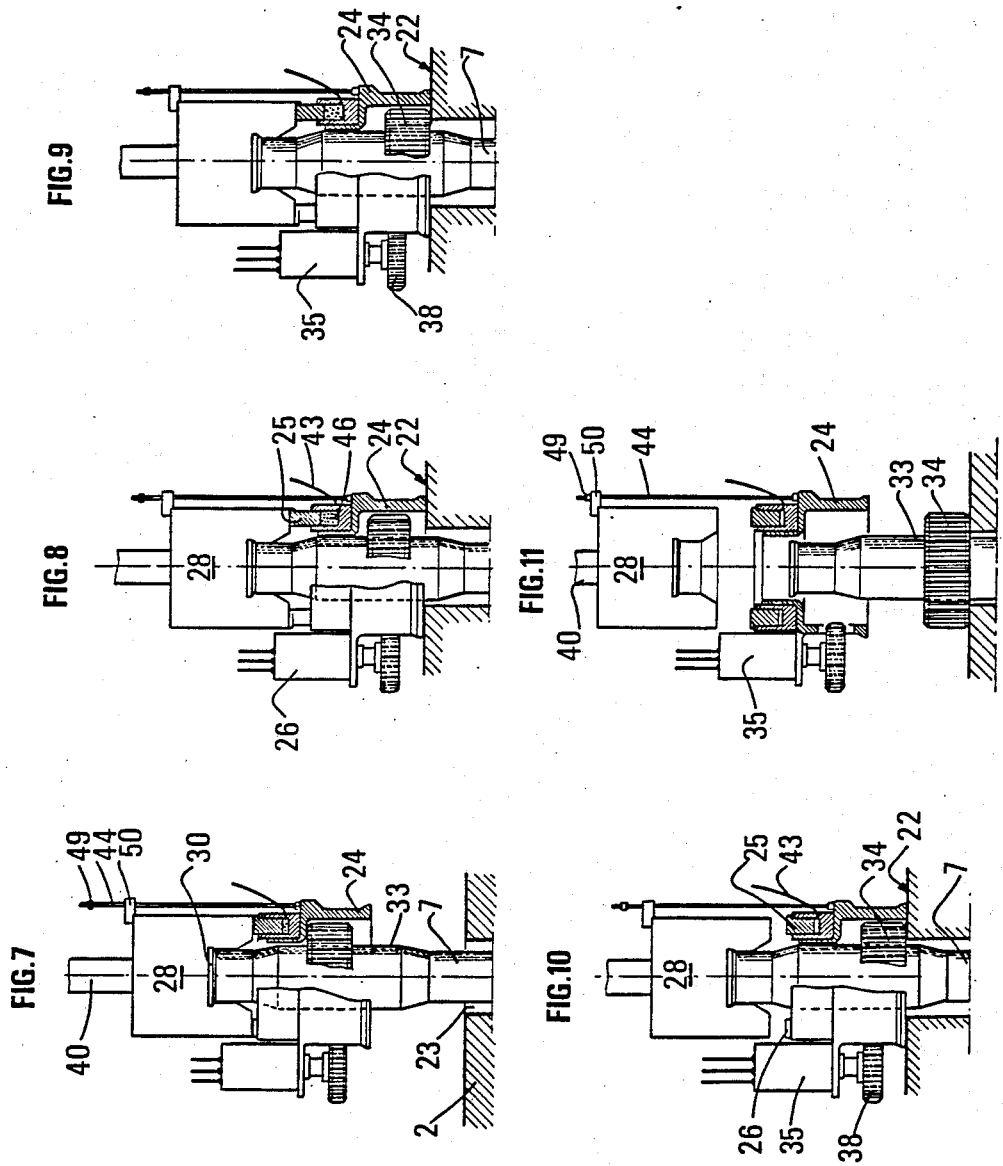

DEVICE FOR THE REMOTE ASSEMBLY OF TWO MEMBERS

This is a continuation of application Ser. No. 863,720, filed May 16, 1986, now abandoned.

BACKGROUND OF THE INVENTION

The present invention relates to a device of the remote assembly of two members.

It is often necessary to assemble two members remotely together, so that they are firmly applied against each other, particularly in a sea environment.

Such an operation is difficult for divers to carry out because of the absence of a bearing point in water. In other cases, such an operation cannot be contemplated because it takes place in environments in which man cannot penetrate.

The prior art may be illustrated by the European Pat. No. EP-A-0.024.180, the French Pat. No. FR-A-2.475.674 and the U.S. Pat. No. 4.297.965.

The present invention provides a device for the remote assembly of two members using at least one oblong assembly element.

SUMMARY OF THE INVENTION

The device of the invention comprises means for anchoring said assembly element on a first one of said members, remote controlled means for tensioning said assembly element and means for locking said assembly element on the second member.

The anchorage means may comprise a body integral with the assembly element, with the body comprising at least one dog adapted for cooperating with a profile integral with a receptacle which is itself integral with the first member, and with the body being housed at least partially in the receptacle.

This body may be hollow and may comprise a piston adapted for sliding in the body, with the piston occupying a position in which it locks the dog in the profile.

The assembly element may be hollow and the piston may comprise a fishing recovery head.

The tensioning means may comprise at least one cylinder actuator.

The locking means may comprise a threaded zone at the end of the oblong assembly element, and a nut cooperating with the threaded zone, with the nut bearing on the second member.

The locking means may comprise a motor whose shaft is equipped with a toothed wheel adapted for cooperating with teeth formed on the external face of the nut.

The tensioning means may comprise a base resting on the second member, actuating cylinders and a connector, with the connector being adapted to grip the end of the oblong assembly element, and with the cylinders bearing between the base and the connector.

This base may comprise rods on which stops may slide, and the rods may also comprise fixed stops for limiting the travel of the sliding stops.

The locking means may comprise a motor resting on the base.

BRIEF DESCRIPTION OF THE DRAWINGS

The present invention will be better understood and its advantages will be more clearly understood from the following description of a particular embodiment, in no wise limitative, illustrated by the accompanying in which:

FIG. 1 shows schematically the whole of the device of the invention applied to the assembly of two buoys including anchorage means, tensioning means and locking means, FIGS. 2 and 3 are partial longitudinal cross-sectional views of the anchorage means, FIG. 4 is a cross-sectional view taken along line 4—4 in FIG. 3, FIG. 5 is a cross-sectional view of the tensioning and locking means, FIG. 6 is a top view of FIG. 5, and FIGS. 7–11 are partial cross-sectional views illustrating different phases of utilization of the device constructed in accordance with the present invention.

DESCRIPTION OF THE PREFERRED EMBODIMENTS

Referring now to the drawings wherein like reference numerals are used throughout the various views to designate like parts and, more particularly, to FIG. 1, according to this figure, an assembly of two buoys, adapted to be disposed in a sea environment, include an auxiliary buoy generally designated by the reference numeral 1 adapted to be assembled to a main buoy generally designated by the reference numeral 2. Such an assembly of the two buoys 1, 2 may be achieved when, for example, a production string, supported by the auxiliary buoy 1 is tensioned by the main buoy 2. The main buoy 2 may be brought to the auxiliary buoy 1 by ballasting, with the tensioning of the production string being achieved after assembly of the two buoys 1, 2 together by removing the ballast of the main buoy 2.

To facilitate the alignment and attachment of the main buoy 2 to the auxiliary buoy 1, guide lines 3, passing through the main buoy 2 through passageways 5, are provided and are fixed to the auxiliary buoy 1 at fixing means 4. Additionally, in a final phase of bringing the two buoys 1, 2 together, fingers 6 may be employed which will allow a final precise approach and alignment of the buoys 1, 2 with the fingers 6 cooperating with the end of the passageways 5.

The assembly of the auxiliary buoy 1 with the main buoy 2 is achieved by oblong assembly elements which are fixed on one side to the auxiliary buoy 1 using anchorage means generally designated by the reference numeral 8 and on the other side to the main buoy through locking means 9.

An assembly device generally designated by the reference numeral 10 of the present invention includes tensioning means generally designated by the reference numeral 20 and locking means generally designated by the reference numeral 21, with FIG. 2 of the drawings showing an anchorage means of the present invention in a non-anchored position and FIG. 3 illustrating the anchorage means in an anchored position. The anchorage means, according to the present invention, include a receptacle 11 integrally formed with the auxiliary buoy 2, with the receptacle 11 comprising a housing 12 and a profile 13 formed inside of the housing 12. The profile 13 may have a sinusoidal, saw tooth, or any other shape which will allow an engagement with a complimentary shape.

In the case shown in FIGS. 2 and 3, an end generally designated by the reference numeral 14 of the oblong assembly element 7 is hollow and comprises a locking member such as a piston 15, as well as an opening in which are disposed dogs 16. The dogs 16 comprise on a part at least of their external faces a profile complementary to the profile 13 formed on the inside of housing 12.

The piston 15 has a position shown in FIG. 3 in which it applies dogs 16 against the profile 13 formed in receptacle 11, thus providing anchorage of the end 14 of the oblong assembly element 7.

In the example shown in FIGS. 2 and 3, the piston is in the form of two cylinders 17 and 18 with different diameters.

When the dogs 16 are in the so called "free" position shown in FIG. 2, they are applied to the smallest diameter cylinder 17. When the dogs 16 are in the locking position shown in FIG. 2, they are applied to the largest diameter cylinder 18.

Piston 15 may be placed in the position corresponding to locking of the dogs 16 by pressurization of the part of the oblong assembly element 7 situated above the piston. Of course, in this case the assembly element 7 will have to comprise a passage for pressurizing the compartment situated above the piston 15.

For example, the assembly element 7 may be hollow over an entire length thereof. This passage may then be used for recovering the piston 15 by a fishing tool suspended from a line. This tool may cooperate with the orifice 19 formed at the top of the piston.

FIG. 4 shows a section of the anchorage means 8 through line 4—4 of FIG. 3.

FIG. 5 shows the tensioning means 20 and the locking means 21.

Reference 22 designates the top of the main buoy 2 and reference 23 the passage formed in the main buoy 2 and which has passing therethrough the oblong assembly element 7 which, in the case of the example shown, comprises a tube.

In the case of FIG. 5, the tensioning means comprise a base 24 bearing on the top 22 of the main buoy 2.

Several actuating cylinders 25, 26 bear on a table 27 formed on the base 24.

A connector 28 comprising jaws 29 is provided for gripping a collar 30 integral with the upper end of the oblong assembly element 7.

Connector 28 has a surface 31 which may come to bear on the cylinders 25 and 26.

Base 24 may comprise a sleeve 32 of the upper end of the assembly element 7.

The locking means 21 comprise threaded zones 23 formed at the upper end of the oblong assembly 7, but under collar 30, nut 34 cooperating with the threaded zones and means for remotely screwing or unscrewing the nut 34. These means comprise, in the embodiment shown in FIG. 6, a hydraulic motor 35, possibly connected to the surface by cables 36, with the cables 36 providing the power supply for motor 35 from the surface.

Motor 35 comprises a shaft 37 for driving a toothed wheel 38 cooperating with teeth 39 integral with the periphery of nut 34.

Connector 28 may be connected to the surface by a suspension tube 40 and actuated by control lines 41 also connected to the surface.

The control lines 41 as well as the cables 36 for supplying the motor 35 with power may be grouped together in an umbilical tube 42. Furthermore, this tube 42 may comprise other lines, connecting the base 24 or elements which it supports to the surface, particularly hydraulic pipes 43 for feeding the cylinders 25 and 26.

In FIG. 5 and/or FIG. 6, which is a partial top view of FIG. 5, the presence of rods 44 will be noted fixed to base 24 at one of their ends and comprising a fixed stop 47, 48 and 49 at the other end.

Furthermore, each of these rods 44 comprises an intermediate stop slidable along the rods 44. These intermediate stops bear on the upper face of connector 28.

Of course the intermediate stops 50, 51 and 52 may be replaced by any other equivalent means, such, for example, a single annular stop.

An example of using the device of the invention is described hereafter.

With the two buoys 1, 2 brought close to one another in the way described above using more especially guide lines 3 and guide fingers 6 and, possibly, acoustic distance sensors, the oblong assembly elements 7 are lowered through the passageways 23.

During this lowering the oblong assembly element 7 is suspended from the connector 28 by collar 30.

Nut 34 may support base 24 on its lower face 45.

The position of the nut on the threaded zone 33 may be such that the cylinders 25 and 26 are in low abutment and in contact with the bearing surface 31 of the connector as shown in FIG. 7. This is not obligatory and a free space may be admitted between cylinders 25 and 26 and the bearing face 31 of connector 28.

Connector 28 may be connected to the surface by tube 40 once the anchorage means are in position in the receptacle 11.

Piston 15 is introduced into the locking position shown in FIG. 3. This piston 15 may be either lowered from the surface through tube 40 and the oblong assembly element 7 itself, or be in the position shown in FIG. 2 at the beginning of the anchorage operation.

Piston 15 may be possibly pumped so as to reach its locking position.

Once this anchorage has been achieved, cylinder 25 and 26 are activated by feeding pressurized fluid into the chambers 46 of the cylinders through the hydraulic line or lines 43. Thus, the pistons of the cylinders tension the oblong assembly element, since the cylinders bearing on the base 24 which itself bears on the top 22 of the buoy 2 push the connector 28 through the bearing surfaces 31.

By means of jaws 29, connector 28 tensions the elongate assembly element 7 as illustrated in FIG. 8.

When the desired tension of the oblong assembly element 7 is attained, the motor 35 (see FIG. 8) is activated in the appropriate direction for applying the nut 35 to the bearing top 22 of buoy 2, through the toothed wheel 38 (see FIG. 9), with the motor 35 being, for example, a hydraulic motor.

This being accomplished, the pressure in the chamber 46 of the cylinders is lowered, which frees the connector 28. During this operation, the forces for maintaining the tension of the oblong assembly elements 7 are transferred to a nut 33 (see FIG. 10).

The jaws 29 of the connector 28 may be released.

The suspension tube 40 is withdrawn. It takes with it the connector 28 which brings the sliding stops 50, 51 and 52 into contact with the fixed stops 47, 48 and 49 and so through rods 44 the base 24 as well as the equipment which it supports, particularly the motor 35 and cylinders 25 and 26, are raised to the surface (see FIG. 11).

The oblong assembly elements 7 remain in position and hold the two buoys 1, 2 together.

For removing the oblong assembly elements 7, the procedure is the reverse of what has been described above.

Pistons 15 are recovered through orifice 19 and a fishing line.

It is evident that the tensioning effect exerted on the assembly element 7 may be greater than or equal to the force which tends in some applications to separate the two members to be assembled together.

What is claimed is:

1. A device for remote assembly of two members by an oblong assembly element, the device comprising means for anchoring said assembly element on a first member of said two members, remote controlled means for tensioning said assembly element on said first member after an anchoring of the assembly element on said first member, and remote controlled means for locking said assembly element on a second member of said two members subsequent to a tensioning by said tensioning means whereby said first and second members are firmly urged against each other and fixedly held together by said assembly element.

2. A device for a remote assembly of two members by an oblong assembly element, the device comprising means for anchoring said assembly element on a first member of said two members including a body integral with said assembly element, said body comprising at least one dog adapted for cooperating with a profile formed integrally with a receptacle integrally formed with said first member, said body being housed at least partially in said receptacle, remote controlled means for tensioning said assembly element on said first member after an anchoring of the assembly element on said first member, and remote controlled means for locking said assembly element on a second member of said two members subsequent to a tensioning by said tensioning means whereby said first and second members are firmly applied against each other.

3. The device as claimed in claim 2, wherein said body is of a hollow configuration and comprises a piston adapted for sliding movement in said body, said piston being adapted to occupy a position for locking said dog in said profile.

4. The device as claimed in claim 3, wherein said assembly element is of a hollow configuration and said piston comprises a fishing head.

5. A device for a remote assembly of two members by an oblong assembly element, the device comprising means for anchoring said assembly element on a first member of said two members, remote controlled means for tensioning said assembly element on said first member after an anchoring of the assembly element on said first member, comprising at least one actuating cylinder, and remote controlled means for locking said assembly element on a second member of said two members subsequent to a tensioning by said tensioning means whereby said first and second members are firmly applied against each other.

6. A device for a remote assembly of two members by an oblong assembly element, the device comprising means for anchoring said assembly element on a first member of said two members, remote controlled means for tensioning said assembly element on said first member after an anchoring of the assembly element on said first member, and remote controlled means for locking said assembly element on a second member of said two members subsequent to a tensioning by said tensioning means comprising a threaded zone at the end of said oblong assembly element, and a nut cooperating with said threaded zone, said nut bearing on said second member, whereby said first and second members are firmly applied against each other.

7. The device as claimed in claim 6, wherein said locking means comprise a motor including a shaft having a toothed wheel adapted for cooperating with teeth formed on an external face of said nut.

8. A device for a remote assembly of two members by an oblong assembly element, the device comprising means for anchoring said assembly element on a first member of said two members, remote controlled means for tensioning said assembly element on said first member after an anchoring of the assembly element on said first member, comprising a base resting on said second member, at least one actuating cylinder and a connector, said connector being adapted for gripping the end of said oblong assembly element, said cylinder bearing between said base and said connector and remote controlled means for locking said assembly element on a second member of said two members subsequent to a tensioning by said tensioning means whereby said first and second members are firmly applied against each other.

9. The device as claimed in claim 8, wherein said locking means comprises a motor resting on said base.

10. A device for a remote assembly of two members by an oblong assembly element, the device comprising means for anchoring said assembly on a first member of said two member, remote controlled means for tensioning said assembly element on said first member after an anchoring of the assembly element on said first member, and remote control means for locking said assembly element on a second member of said two members subsequent to a tensioning of said tensioning means, said tensioning means comprises a base resting on a second member, at least one actuating cylinder and a connector, said connector being adapted for gripping an end of said oblong assembly element, said cylinder bearing between said base and said connector, and wherein said base comprises rods having slide stops slidably mounted thereon, fixed stops being provided on said rods for limiting a travel of said sliding stops.

11. A device for a remote assembly of two members by an oblong assembly element, the device comprising means for anchoring said assembly element on a first member of said two members, remote controlled means for tensioning said assembly element on said first member after an anchoring of the assembly element on said first member, and remote controlled means for locking said assembly element on a second member of said two members subsequent to a tensioning by said tensioning means whereby said first and second members are firmly applied against each other, and wherein at least one of said first and second members is a buoy.

* * * * *